(No Model.)

M. RINGS.
CAR FENDER.

No. 574,044. Patented Dec. 29, 1896.

Witnesses:

Inventor
Matthew Rings
By James J. Sheehy
Attorney

United States Patent Office.

MATTHEW RINGS, OF SEATTLE, WASHINGTON, ASSIGNOR OF ONE-HALF TO CHARLES E. DYER, OF SAME PLACE.

CAR-FENDER.

SPECIFICATION forming part of Letters Patent No. 574,044, dated December 29, 1896.

Application filed July 20, 1896. Serial No. 599,940. (No model.)

*To all whom it may concern:*

Be it known that I, MATTHEW RINGS, a citizen of the United States, residing at Seattle, in the county of King and State of Washington, have invented certain new and useful Improvements in Car-Fenders; and I do declare the following to be a full, clear, and exact description of the invention, such as will enable others skilled in the art to which it appertains to make and use the same.

My invention relates to improvements in car-fenders; and its novelty and many advantages will be fully understood from the following description and claim, when taken in conjunction with the annexed drawings, in which—

Figure 1:
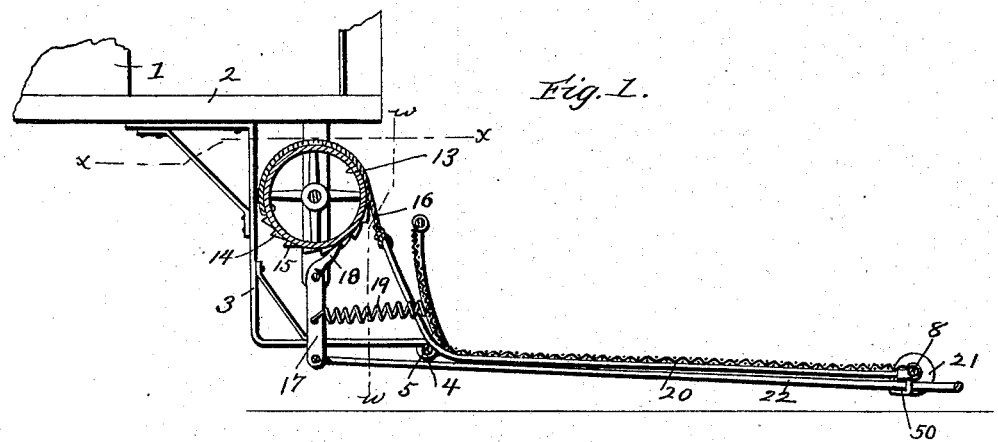
Figure 2:
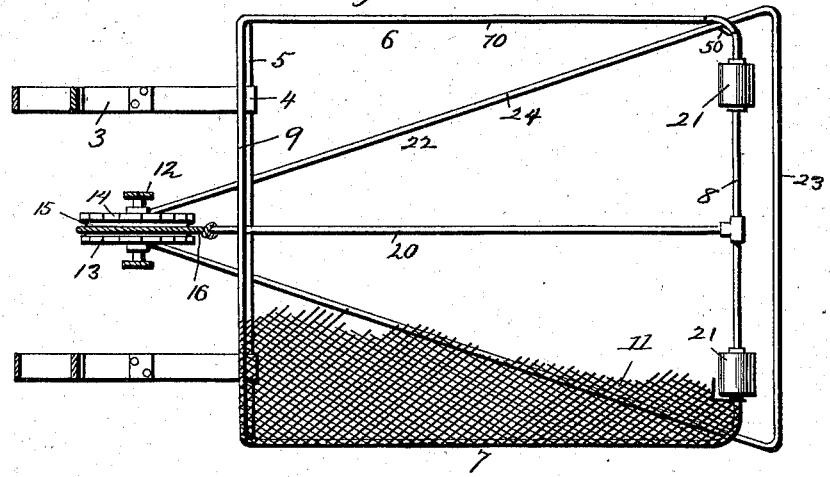
Figure 3:
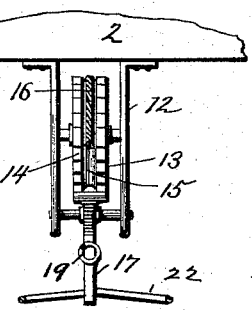

Figure 1 is a vertical section, partly in elevation, illustrating my improved fender properly attached to the platform of a car. Fig. 2 is a horizontal section taken in the plane indicated by the line $xx$ of Fig. 1, with part of the network broken away; and Fig. 3 is a detail section taken in the plane indicated by line $ww$ of Fig. 1, looking rearwardly.

In the said drawings similar figures designate corresponding parts in all of the views, referring to which—

1 indicates the body of a car, which is provided with the usual platform 2, and 3 indicates the brackets or hangers of my improved fender, which are arranged beneath and connected to the platform 2, as shown. These brackets 3 are preferably of the form shown, although they may be of any other suitable form, and they are provided at their forward ends with bearings 4, in which is journaled the transverse bar 5 of the frame 6 of the fender proper, 7, as shown, for a purpose presently described.

The fender proper, 7, comprises the frame 6, which has the aforesaid bar 5, the forward transverse bar 8, the rear transverse bar 9, which rests in a plane above the bar 5, the side bars 10, and the longitudinal central bar 20, which is connected to the bars 8 and 5, and extends upwardly from the latter and the netting or network 11, which is connected to the several bars of the frame 6 in any suitable manner and is designed and adapted to afford a soft rest for persons taken up by the fender, so as to obviate seriously injuring them.

12 indicates a hanger which is connected to and depends from the platform 2.

13 indicates a wheel which is journaled in the hanger 12 and is provided with ratchet-teeth 14, and is also preferably provided with a peripheral groove 15.

16 indicates a strap which is connected at one end to the periphery of the wheel 13 and at its opposite end to the rear end of the rod 20, and 17 indicates a lever which is fulcrumed in the hanger below the wheel 13 and has one end shaped into or provided with a pawl 18, designed to engage the teeth 14 of the wheel 13, and its opposite end connected to a coiled spring 19, the opposite end of which is connected to the rear upwardly-extending portion of the fender proper, as shown.

With the fender proper in the position shown in Fig. 1, and the pawl of lever 17 engaging the wheel 13, it will be seen that the said wheel will be locked against forward rotation, and consequently the forward end of the fender proper will be held in the slightly-raised position shown. This is desirable, because it prevents wear of the fender and also prevents it from striking and being damaged by stones and other small obstructions on the track.

The fender proper is better able to pick up and carry a person when it bears upon the track-rail, and I have therefore provided it upon its forward frame-bar 8 with rollers 21, designed to travel upon the track-rails, (not illustrated,) and I have also provided the trigger 22, which is fixedly connected to the lower end of the lever 17, and extends forwardly beneath the fender proper to a point in advance of the same, as shown. This trigger 22 preferably comprises the forward cross-bar 23, which extends the full width of the fender proper, and the rearwardly-converging side bars 24, which are connected at their rear ends to the lever 17 and extend loosely through loops 50, connected to the frame 6 of the fender proper, and in virtue of its arrangement it will be seen that the said trigger will first strike a person upon the track. When this takes place, the trigger 22 and the lower end of the bar 17 will be pushed rearwardly, and the upper pawl end of said lever will be disengaged from the toothed wheel 13, which will permit said wheel to rotate forwardly and the forward end of the fender proper to bear upon the track-rails, so as to safely pick up and carry the person until the car comes to a stop. In virtue of this it will be seen that the fender proper will take beneath rather than strike a person on the track, and will consequently take up and carry such person without in any way seriously injuring him or her.

When it is desired, after the fender has been in operation, to return the same to and secure it in its raised position, it is simply necessary to raise the forward end of the fender proper and then turn the wheel 13 rearwardly, so as to take up the slack of the strap 16, when the lever 17, engaging the wheel 13, will hold said wheel against forward rotation, and will consequently hold the fender proper in its raised position.

It will be seen from the foregoing that with all of its advantages my improved fender is very simple and cheap, and that it may be quickly and easily applied to cars such as at present in use, and when so applied adds but little to the weight of the car.

In practice a chain or other suitable flexible connection may be employed in lieu of the strap 13.

Having described my invention, what I claim, and desire to secure by Letters Patent, is—

The combination of a car-body, brackets connected thereto and having journal-bearings, the fender proper comprising the frame having the transverse bar 5, journaled in the bearings of the brackets, the forward cross-bar 8, the rear cross-bar 9, arranged above the bar 5, side bars connecting the cross-bars and the longitudinal central bar 20, connected to the bars 8, and 5, and extending upwardly from the latter, and the netting connected to the frame, the hanger connected to the car-body, the wheel carried by said hanger and having ratchet-teeth, a flexible connection between said wheel and the bar 20, of the fender-frame, the lever fulcrumed in the hanger and having the pawl engaging the teeth of the wheel, a spring connecting the opposite end of the lever and the fender proper, and the trigger connected to the lever and extending forwardly to a point in advance of the fender proper and having the forward cross-bar, substantially as specified.

In testimony whereof I affix my signature in presence of two witnesses.

MATTHEW RINGS.

Witnesses:
 BURT J. HUMPHREY,
 G. H. FORTSON.